United States Patent
Lin et al.

(10) Patent No.: US 9,639,844 B2
(45) Date of Patent: May 2, 2017

(54) METHOD AND APPARATUS OF IDENTIFYING A WEBSITE USER

(71) Applicant: Alibaba Group Holding Limited, Grand Cayman (KY)

(72) Inventors: Guli Lin, Hangzhou (CN); Depin Chen, Hangzhou (CN); Zhiqiang Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 119 days.

(21) Appl. No.: 14/152,463

(22) Filed: Jan. 10, 2014

(65) Prior Publication Data
US 2014/0201048 A1 Jul. 17, 2014

(30) Foreign Application Priority Data

Jan. 11, 2013 (CN) .......................... 2013 1 0011312

(51) Int. Cl.
*G06Q 40/00* (2012.01)
*G06Q 30/00* (2012.01)
*G06Q 10/10* (2012.01)

(52) U.S. Cl.
CPC ......... *G06Q 30/0185* (2013.01); *G06Q 10/10* (2013.01)

(58) Field of Classification Search
CPC ........ G06Q 40/00; G06Q 20/10; G06Q 20/40; G06Q 20/382; G06Q 20/3674
(Continued)

(56) References Cited

U.S. PATENT DOCUMENTS 7,458,508 B1  12/2008 Shao et al.
7,562,814 B1*  7/2009 Shao et al. .................... 235/380
(Continued)

FOREIGN PATENT DOCUMENTS

CN   102056189   9/2013
WO   2011041610  4/2011

OTHER PUBLICATIONS

PCT Search Report and Written Opinion mailed Aug. 21, 2014 for PCT Application No. PCT/US14/11045, 12 Pages.
(Continued)

*Primary Examiner* — Lalita M Hamilton
(74) *Attorney, Agent, or Firm* — Lee & Hayes, PLLC

(57) ABSTRACT

A method and an apparatus of identifying a website user are disclosed herein. The method includes: obtaining accounts and user identities from a database; building a connected graph by taking the accounts and the user identities as nodes and connecting account nodes and user identity nodes having association relationship therewith; finding a connected component from the connected graph, accounts corresponding to all account nodes in the connected component forming an account group that is bound to a same website user; computing an account density and a fraud account closing rate of the account group; determining whether the account density and the fraud account closing rate are within respective predetermined normal value ranges; and if affirmative, determining that the account group is a dangerous account group and a website user bound to the dangerous account group is a dangerous website user; otherwise, determining that the account group is a normal account group and a website user bound to the normal account group is a normal website user.

20 Claims, 11 Drawing Sheets

(58) Field of Classification Search
USPC .......................... 705/35, 38, 39, 44, 64, 67
See application file for complete search history.

(56) References Cited

U.S. PATENT DOCUMENTS

| | | | |
|---|---|---|---|
| 8,359,278 B2* | 1/2013 | Domenikos et al. .......... 705/325 |
| 8,386,381 B1* | 2/2013 | Barton .................. G06Q 40/00 |
| | | | 705/35 |
| 8,489,476 B1* | 7/2013 | Lester .................. G06Q 40/02 |
| | | | 705/35 |
| 2004/0026499 A1 | 2/2004 | Fujioka |
| 2004/0078325 A1* | 4/2004 | O'Connor ............. G06Q 20/04 |
| | | | 705/39 |
| 2006/0136595 A1* | 6/2006 | Satyavolu ............... G06F 21/41 |
| | | | 709/229 |
| 2006/0149674 A1 | 7/2006 | Cook et al. |
| 2006/0282660 A1 | 12/2006 | Varghese et al. |
| 2007/0112667 A1 | 5/2007 | Rucker |
| 2007/0239606 A1 | 10/2007 | Eisen |
| 2008/0021787 A1* | 1/2008 | Mackouse ............. G06Q 20/10 |
| | | | 705/17 |
| 2009/0192810 A1 | 7/2009 | Filatov et al. |
| 2009/0265211 A1 | 10/2009 | May et al. |
| 2010/0095374 A1 | 4/2010 | Gillum et al. |
| 2010/0169137 A1 | 7/2010 | Jastrebski et al. |
| 2011/0082768 A1 | 4/2011 | Eisen |
| 2011/0238539 A1* | 9/2011 | Phillips .................. G06Q 20/40 |
| | | | 705/30 |
| 2012/0130853 A1 | 5/2012 | Petri et al. |
| 2012/0197802 A1* | 8/2012 | Smith .................... G06Q 20/12 |
| | | | 705/44 |
| 2012/0239541 A1* | 9/2012 | Tsukahara ............ G06Q 20/425 |
| | | | 705/35 |
| 2012/0278868 A1 | 11/2012 | Boding et al. |
| 2013/0091043 A1 | 4/2013 | Leibon et al. |
| 2013/0139236 A1 | 5/2013 | Rubinstein et al. |
| 2013/0332358 A1 | 12/2013 | Zhao |
| 2014/0114843 A1* | 4/2014 | Klein .................... G06F 21/566 |
| | | | 705/39 |

OTHER PUBLICATIONS

Extended European Search Report mailed Jul. 7, 2016 for European Patent Application No. 14701880.8, 4 pages.
Chinese Office Action dated Aug. 8, 2016 from Chinese Patent Application 2013100113128, 4 pages.

* cited by examiner

METHOD AND APPARATUS OF IDENTIFYING A WEBSITE USER

CROSS REFERENCE TO RELATED PATENT APPLICATION

This application claims foreign priority to Chinese Patent Application No. 201310011312.8 filed on Jan. 11, 2013, entitled "Method and Apparatus of Identifying a Website User", which is hereby incorporated by reference in its entirety.

TECHNICAL FIELD

The present disclosure relates to a computer application field, and more particularly, relates to methods and apparatuses of identifying a website user.

BACKGROUND

Each type of website generally has a large volume of website users. Out of these website users, some website users, after logging into a website, use that website as a platform to conduct certain fraudulent activities with other website users. For example, some sellers, such as website users of Taobao Marketplace, may post fake product information on Taobao Marketplace and steal money from buyers by not sending products after a payment is received. With respect to a website system, these website users who conduct fraudulent activities belong to dangerous website users.

In order to prevent and control fraudulent activities of dangerous website users, it is necessary to accurately identify who dangerous website users are from an enormous volume of website users. Generally, a website user logs into a website through an account, and accounts bound with different website users are different. Therefore, a website user can be directly identified using his/her account. Furthermore, by determining whether a certain account has been involved in a fraudulent event, a determination is made as to whether a website user that is bound to that account is a dangerous website user. For those website users who are determined to be dangerous, the website can further adopt a prevention and control measure, such as closely monitoring corresponding accounts or closing the corresponding accounts if needed. However, these dangerous website users usually register multiple accounts on a same website by various means, and can use other active accounts to continuously conduct fraudulent activities after one account is closed.

When a website user logs into a website through an account, a server usually records basic information that indicates user identity of the user, for example, IP address, Agent, cookie, user ID (such as an email or a mobile phone number of the user) or a MAC (Medium/Media Access Control) address, etc. Even though a website user may register multiple accounts on a same website, these accounts may very likely be associated with a same user identity. For example, all accounts are associated with a same IP address when a website user utilizes a same computer to register the accounts on a same website. When multiple accounts are associated with a same user identity, an account group that is constructed from these accounts may likely be bound to a same website user. Therefore, an account group associated with a same user identity may also be used for identifying a website user in addition to an account. Moreover, by determining whether a certain account has been involved in a fraudulent event, a determination may be made as to whether a website user that is bound to that account is a dangerous website user. For example, a server may enlist all user identities associated with an account in a blacklist. Any website user who is bound to an account associated with a user identity in the blacklist is a dangerous website user.

However, existing technologies have at least the following problems: although identifying a website user using an account group associated with a same user identity has a broader scope of identification and a higher accuracy rate as compared to using an account, a dangerous website user is more cautious and all accounts used thereby may not share a same user identity. For example, when a website user uses different computers to register a plurality of accounts, these accounts will be associated with different IP addresses. Therefore, a process of using user identity associated with an account that has been found to be involved in fraudulent activities still fails to comprehensively identify a dangerous website user, with an accuracy thereof being limited to a certain extent. In addition, when determining an account group using the above association relationship, all accounts and user identities need to be searched in order to find an account group associated with a same user identity. As the number of the accounts and user identities are tremendous, the workload of the server in performing the above searches is very heavy, resulting in very low processing speed of the server.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

In order to solve the above technical problems, embodiments of the present disclosure provide a method and an apparatus of identifying a website user that improve an accuracy rate of identification and enhance a processing speed of a server by effectively identifying website users, and achieve a goal of preventing against a fraudulent event in advance.

The embodiments of the present disclosure provide the following technical scheme.

A first embodiment concerns a method of identifying a website user including:

obtaining accounts and user identities from a database;

building a connected graph by taking the accounts and the user identities as nodes and connecting account nodes and user identity nodes having association relationship therewith;

finding a connected component from the connected graph, accounts corresponding to all account nodes in the connected component forming an account group that is bound to a same website user;

computing an account density and a fraud account closing rate of the account group;

determining whether the account density and the fraud account closing rate are within respective predetermined normal value ranges; and if affirmative, determining that the account group is a dangerous account group and a website user bound to the dangerous account group is a dangerous website user;

otherwise, determining that the account group is a normal account group and a website user bound to the normal account group is a normal website user.

Another embodiment concerns a method of identifying a website user including:

obtaining accounts and user identities from a database;

building a connected graph by taking the accounts and the user identities as nodes and connecting account nodes and user identity nodes having association relationship therewith;

finding a connected component from the connected graph, accounts corresponding to all account nodes in the connected component forming an account group that is bound to a same website user;

determining whether an account that has been closed due to a fraud and/or a suspected fraud exists in the account group; and if affirmative, determining that the account group is a dangerous account group and a website user bound to the dangerous account group is a dangerous website user;

otherwise, determining that the account group is a normal account group and a website user bound to the normal account group is a normal website user.

Another embodiment concerns an apparatus of identifying a website user including:

an acquisition module used for obtaining accounts and user identities from a database;

a creation module used for building a connected graph by taking the accounts and the user identities as nodes and connecting account nodes and user identity nodes having association relationship therewith;

a search module used for finding a connected component from the connected graph, accounts corresponding to all account nodes in the connected component forming an account group that is bound to a same website user;

a first parameter computation module used for computing an account density and a fraud account closing rate of the account group;

a first parameter determination module used for determining whether the account density and the fraud account closing rate are within respective predetermined normal value ranges; and a first website user identification module used for determining that the account group is a dangerous account group and a website user bound to the dangerous account group is a dangerous website user if a determination result of the first parameter determination module is affirmative, and determining that the account group is a normal account group and a website user bound to the normal account group is a normal website user otherwise.

Another embodiment concerns an apparatus of identifying a website user, including:

an acquisition module used for obtaining accounts and user identities from a database;

a creation module used for building a connected graph by taking the accounts and the user identities as nodes and connecting account nodes and user identity nodes having association relationship therewith;

a search module used for finding a connected component from the connected graph, accounts corresponding to all account nodes in the connected component forming an account group that is bound to a same website user;

a determination module used for determining whether an account that has been closed due to a fraud and/or a suspected fraud exists in the account group; and a second website user identification module used for determining that the account group is a dangerous account group and a website user bound to the dangerous account group is a dangerous website user if a determination result of the determination module is affirmative, and determining that the account group is a normal account group and a website user bound to the normal account group is a normal website user otherwise.

As can be seen from the above, the example embodiments find directly and indirectly associated accounts from the massive volume of accounts and user identities in a database using graph theory. Identification of a website user based on the fact that an account group constructed from the accounts and the user identities associated with these accounts belongs to a same website user is more comprehensive and more accurate. In addition, when finding the account group using the graph theory, a server does not need to perform searches in all accounts and user identities, thus reducing the workload of the server and improving the processing speed of the server. With regard to a website user who owns an account group, identification can be made in advance as to whether the website user is a dangerous website user based on computing an account density and a fraud account closing rate of the account group. Alternatively, identification can be made in advance as to whether the website user is a dangerous website user by determining whether the account group includes an account that has been closed due to fraud and/or suspected fraud.

BRIEF DESCRIPTION OF THE DRAWINGS

In order to clearly describe the technical schemes of the embodiments of the present disclosure or existing technologies, accompanying figures that are needed for describing the embodiments or the existing technologies are introduced briefly hereinafter. The accompanying figures in the following description are merely some embodiments of the present disclosure. One of ordinary skill in the art may obtain other figures based on these accompanying figures without any creative efforts.

FIGS. 4-1, 4-2, 4-3 and 4-4 are schematic diagrams of finding a connected component in accordance with the present disclosure.

DETAILED DESCRIPTION

The embodiments of the present disclosure provide a method and an apparatus of identifying a website user. Using graph theory, accounts that are directly and indirectly associated are found from the massive volume of accounts and user identities in a database. Identification of a website user based on the fact that an account group constructed from the accounts and the user identities associated with these accounts belongs to a same website user is more comprehensive and more accurate. In addition, when finding the account group using the graph theory, a server does not need to perform searches in all accounts and user identities, thus reducing the workload of the server and improving the processing speed of the server. With regard to a website user who owns an account group, identification can be made in advance as to whether the website user is a dangerous website user based on computing an account density and a fraudulent account closing rate of the account group. Alternatively, identification can be made in advance as to whether the website user is a dangerous website user by determining whether the account group includes an account that has been closed due to fraud and/or suspected fraud.

In order to more clearly and easily understand the goals, characteristics and advantages of the present disclosure, the embodiments of the present disclosure are described in detail with reference to the accompanied figures.

First Embodiment

Figure 1:
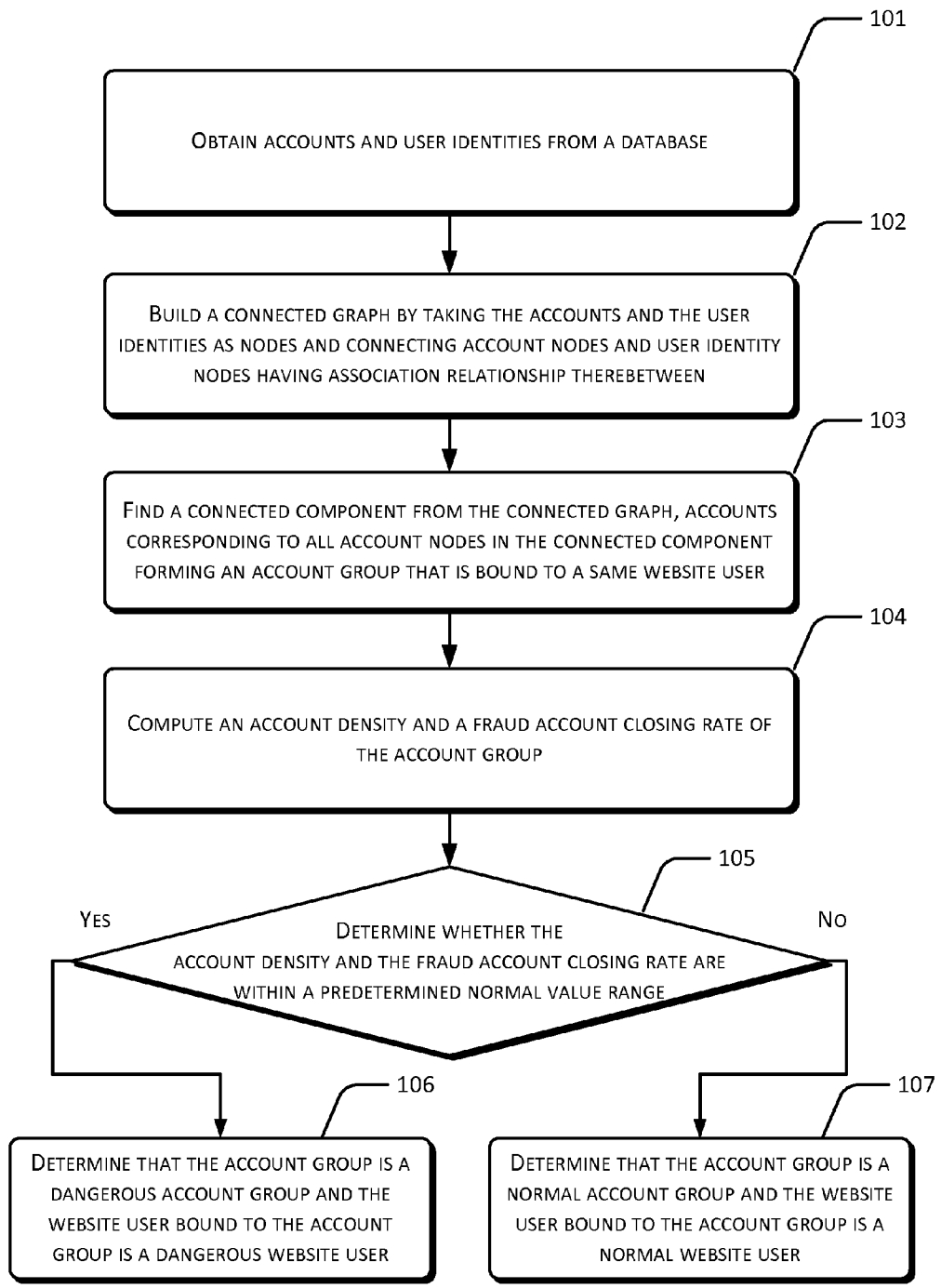
FIG. 1 is a flowchart of an example method of identifying a website user in accordance with the present disclosure.

FIG. 1 is a flowchart of an example method of identifying a website user in accordance with the present disclosure. The method includes:

Block 101 obtains accounts and user identities from a database.

When website users log into a website, a server will record an account and some user identities associated with each website user when logging into the website, and stores them in a database. In a practical implementation, accounts and user identities stored in a certain period of time (e.g., within last three months) may be obtained periodically from the database.

For example, the accounts and the user identities obtained from the database may include the following information: (1) a list of all user identities that are associated with each account; and (2) a list of all accounts that are associated with each user identity. This information may be taken as an adjacency list that is used to represent a connected graph in graph theory and the connected graph is constructed based on the adjacency list.

Block 102 builds a connected graph by taking the accounts and the user identities as nodes and connecting account nodes and user identity nodes having association relationship therebetween.

Figure 2:
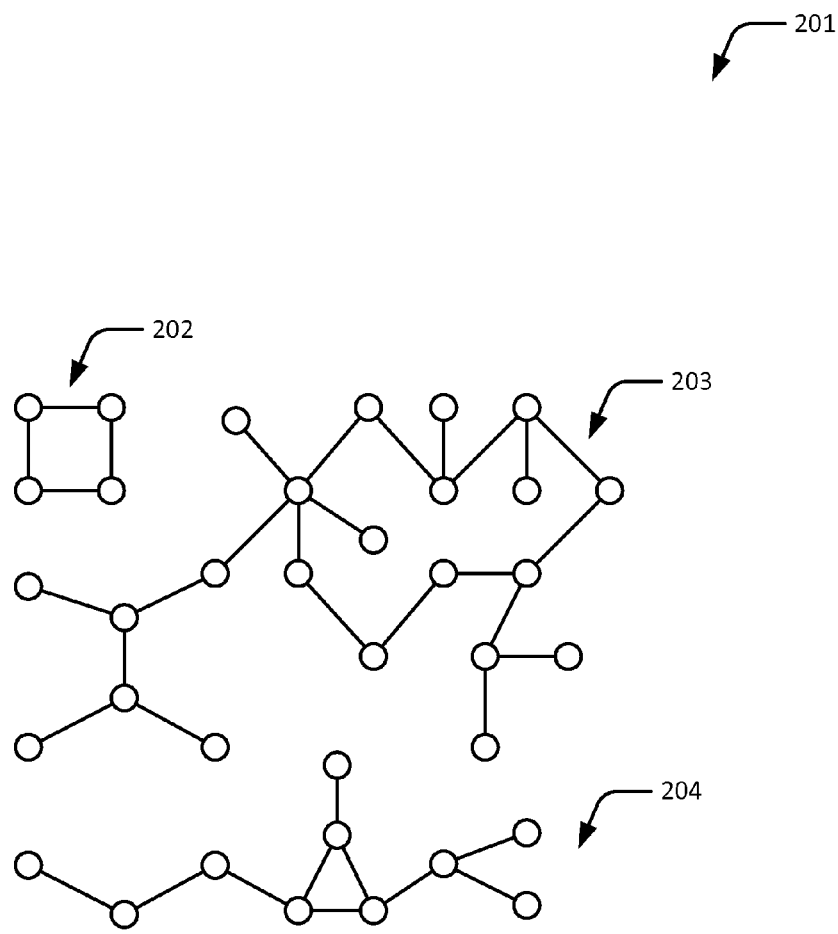
FIG. 2 is a schematic diagram illustrating a connected graph in a graph theory.

FIG. 2 shows a schematic diagram of a connected graph 201 in graph theory. The connected graph in FIG. 2 is constructed by three connected components 202, 203 and 204. In graph theory, if a path exists between any two nodes and these nodes are not connected with a node outside a sub-graph, this sub-graph is referred as a connected component. In FIG. 2, a circle symbol represents a node in a connected component. In the present disclosure, an account and a user identity is taken as nodes, and a connecting line in FIG. 2 represents a path in the connected component. In the present disclosure, if an association relationship exists between an account and a user identity, a path may be created between an account node corresponding to the account and a user identity node corresponding to the user identity.

Block 103 finds a connected component from the connected graph, accounts corresponding to all account nodes in the connected component forming an account group that is bound to a same website user.

After the connected graph as shown in FIG. 2 is created using the accounts and the user identities, a connected component can be found from the connected graph using a label extension method of graph theory. Other methods of graph theory may be used for finding a connected component in the connected graph. The present disclosure has no limitation thereto.

Figure 3:
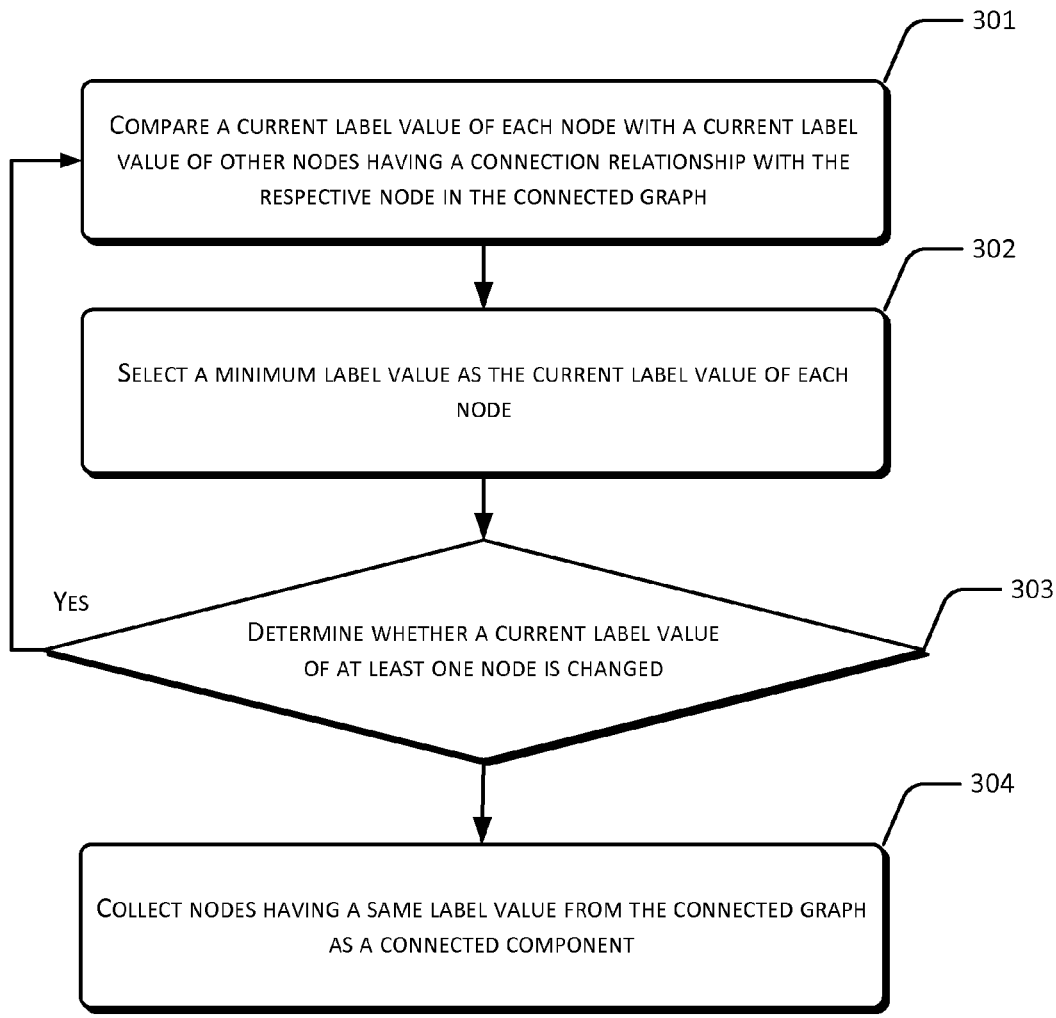
FIG. 3 is a schematic diagram illustrating a method of finding a connected component in a connected graph using a label extension method in accordance with the present disclosure.

FIG. 3 shows a schematic diagram illustrating a method of finding a connected component in a connected graph using a label extension method in accordance with the present disclosure. Finding a connected component from the connected graph includes:

Block 301 compares a current label value of each node with a current label value of other nodes having a connection relationship with the respective node in the connected graph.

Block 302 selects a minimum label value as the current label value of each node.

Block 303 determines whether a current label value of at least one node is changed. Return to block 301 if affirmative, and go to block 304 otherwise.

Block 304 extracts nodes having a same label value from the connected graph as a connected component.

Figures 1, 2, 3, 4:
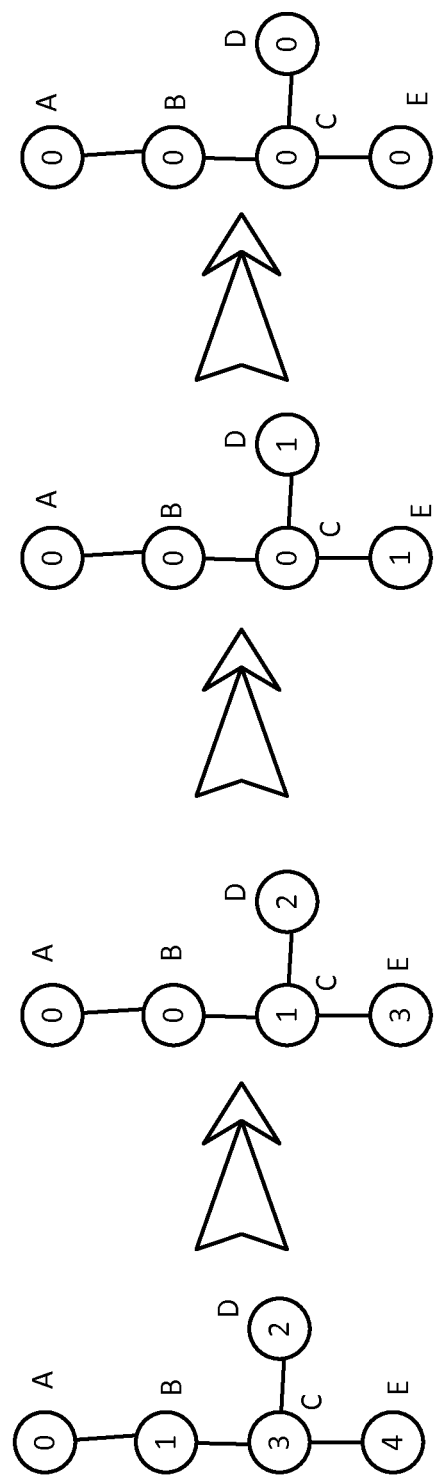

For example, as shown in FIG. 4-1, a connected graph is assumed to have five nodes A, B, C, D, and E, and the five nodes are labeled, each node with a label value. By way of example, the five nodes can be labeled using five arbitrary numbers. Of course, a simpler way is to label the nodes from the top to the bottom. Current label values of these five nodes are supposed to be zero, one, three, two and four respectively after labeling. A current label value of node A is sent to node B. A current label value of node B is sent to nodes A and C. A current label value of node C is sent to nodes B, D and E. A current label value of node D is sent to node C. A current label value of node E is sent to node C. For node A, since the current label value of node A is zero and the received current label value of node B is one, the current label value of the node A remains as zero. For node B, since the current label value of node B is one and the received current label value of node A is zero, the current label value of node B is changed from one to zero, and so on. As shown in FIG. 4-2, after a first turn of update, the current label value of node B has been changed from one to zero, the current label value of node C has been changed from three to one, the current label value of node D remains as two, and the current label value of node E has been changed from four to three.

Since respective current label values of the nodes B, C and E are changed, the current label value of each node is sent to all other nodes that have a connection relationship with the respective node, and the current label value of each node is updated for a second time. As shown in FIG. 4-3, after a second update, the current label value of node C has been changed from one to zero, the current label value of node D has been changed from two to one, the current label value of node E has been changed from three to one, and the current label values of the nodes A and B remain as zero.

Since the current label values of the nodes C, D and E are changed, the current label value of each node is sent to all other nodes that have a connection relationship with the respective node, and the current label value of each node is updated for a third time. As shown in FIG. 4-4, after a third update, the current label value of node D has been changed from one to zero, the current label value of node E has been changed from one to zero, and the current label values of other nodes do not change and remain to be zero.

Since the current label values of the nodes D and E are changed, the current label value of each node is sent to all other nodes that have a connection relationship with the respective node, and the current label value of each node is updated for a fourth time. After a fourth update, the current label values of all nodes D do not change and remain as zero. The process of update is terminated. At this time, nodes A-E possess a same label value and form a connected component. The above corresponds to finding nodes that have a same label value using graph theory's label extension method. In graph theory, nodes having a same label value are considered as a connected component in a connected graph. Accounts corresponding to all account nodes in the connected component form an account group which is bound to a same website user. For example, if nodes A and C are user identity nodes and nodes B, D and E are account nodes in FIGS. 4-1, 4-2, 4-3 and 4-4, accounts that correspond to nodes B, D and E form an account group, and the account group is bound to a same website user. In other words, that account group identifies a same website user. Furthermore, the account group obtained using the graph theory may include not only directly associated accounts but also indirectly associated accounts. The directly associated accounts correspond to a group of accounts that are associated with a same user identity. The indirectly accounts correspond to: for accounts A and B, if a series of accounts $X_1, X_2, \ldots, X_m$ (m≥1) are found such that A and $X_1$ are directly associated, $X_i$ and $X_i+1$ (1≤i≤n−1) are directly associated, and $X_m$ and B are directly associated, A and B are then accounts indirectly associated with each other.

Block 104 computes an account density and a fraud account closing rate of the account group.

The account density of the account group is computed through the following approach:

counting a total number of all accounts and a sum of node degrees of account nodes corresponding to all the accounts in the account group; and calculating the account density according to a formula:

$$\frac{\text{the sum of the node degrees of the account nodes corresponding to all the accounts in the account group}}{n \times (n-1)},$$

wherein n is the total number of all accounts in the account group.

In graph theory, a node degree of a node corresponds to a number of nodes connected to that node. For example, only node B is connected to node A in FIG. 4. In other words, the number of nodes connected to node A is one, and a node degree of node A is one. Nodes A and C are connected to node B. In other words, the number of nodes connected to node B is two, and a node degree of node B is two.

The fraud account closing rate of the account group is computed using the following approach:

counting a total number of all accounts and a number of accounts that have been closed due to a fraud and/or a suspected fraud in the account group; and calculating a ratio between the number of accounts that have been closed due to a fraud and/or a suspected fraud and the total number of all the accounts in the account group. The ratio corresponds to the fraud account closing rate of the account group.

A monitoring system of a website monitors activities associated with all accounts. If a fraudulent activity performed by a certain account is found, that account will be closed as a fraud account. If an abnormal activity associated with a certain account is discovered upon analysis, the account will be closed as a suspected fraud account. The system further performs labeling of these accounts that are closed due to fraud or suspected fraud. In the present disclosure, which accounts in the account group that have been closed due to fraud or suspected fraud can be directly identified through the labeling, and a number thereof can be calculated.

Block 105 determines whether the account density and the fraud account closing rate are within a predetermined normal value range, and goes to block 106 if affirmative or goes to block 107 otherwise.

Block 106 determines that the account group is a dangerous account group and the website user bound to the account group is a dangerous website user. The process is ended.

Block 107 determines that the account group is a normal account group and the website user bound to the account group is a normal website user. The process is ended.

In block 107, an account density of all accounts that are bound to a known dangerous website user may be calculated empirically in advance. An average value may be determined using sample statistics, and the average value can be used as a normal value range for the account density. Similarly, a normal value range for the fraud account closing rate may be obtained.

In a practical implementation, different normal value ranges may be configured based on the total number of accounts in an account group. For example, if the total number of accounts in an account group is within a closed interval of [5, 2000], a normal value range for an account density can be configured as a semi-closed interval of [0.5, 1), and a normal value range for a fraud account closing rate can be configured as a semi-closed interval of [0.1, 1). The normal value ranges of the account density and the fraud account closing rate can be configured to different internals if the total number of accounts in the account group is within another range. The present disclosure has no limitation on specific intervals for a normal value range of an account density and a normal value range of a fraud account closing rate.

When an account group is determined as a dangerous account group, all accounts in that dangerous account group may be considered as fraudulent. Furthermore, as all the accounts in the dangerous account group are bound to a same website user, the website user is a dangerous website user. The system may monitor all the accounts in the dangerous account group and close the accounts if needed.

As can be seen from above, the example embodiments find directly and indirectly associated accounts from the massive volume of accounts and user identities in a database using graph theory. A website user can be comprehensively and accurately identified from an account group constructed from the accounts and the user identities associated with these accounts that belongs to a same website user. In addition, when finding the account group using the graph theory, a server does not need to perform searches in all accounts and user identities, thus reducing the workload of the server and improving the processing speed of the server. With regard to a website user who owns an account group, identification can be made in advance as to whether the website user is a dangerous website user based on computing an account density and a fraud account closing rate of the account group, thus achieving the goal of preventing a fraud event in advance.

Second Embodiment

Figure 5:
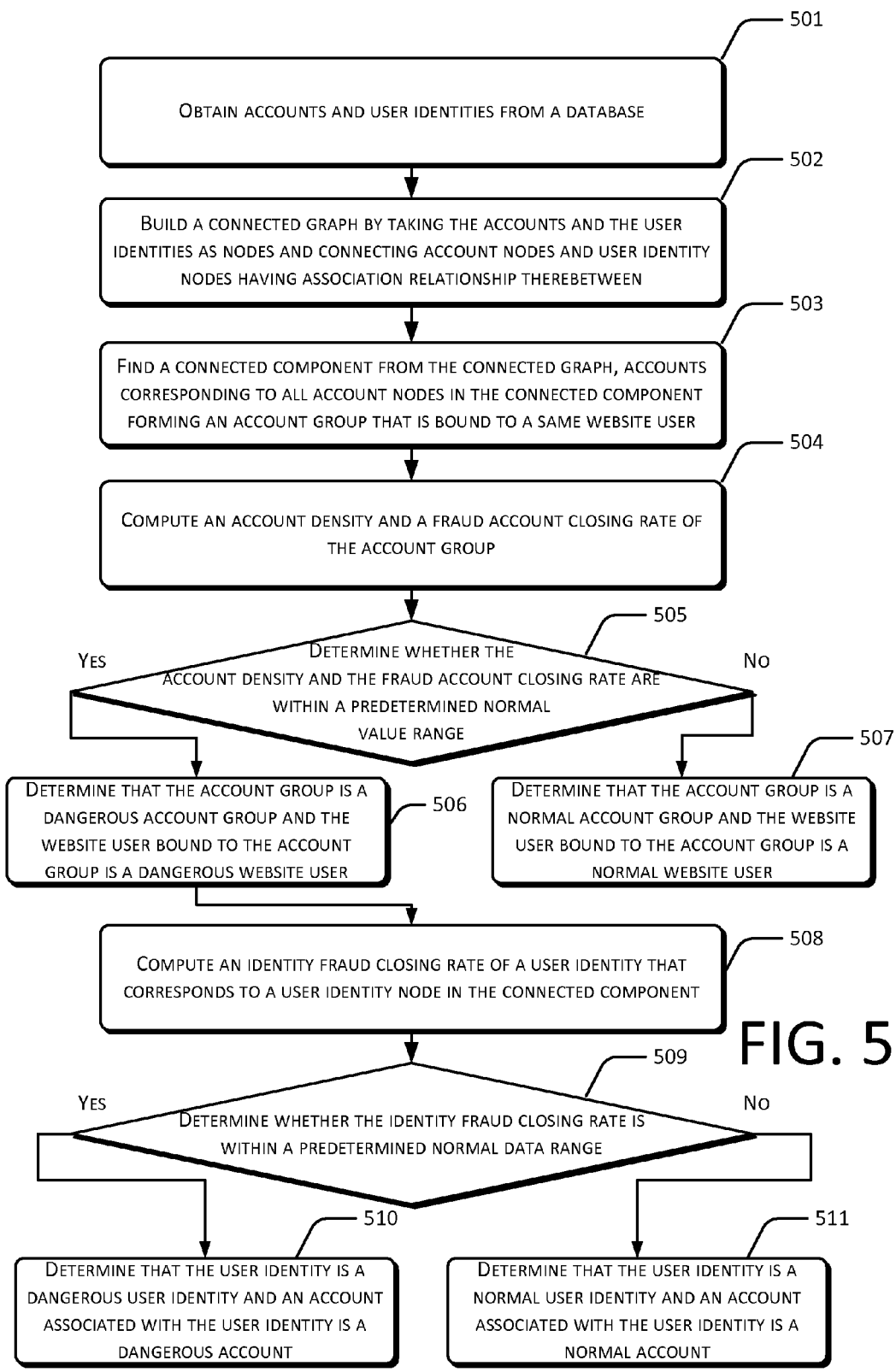
FIG. 5 is a flowchart of another method of identifying a website user in accordance with the present disclosure.

When a certain account group is determined as a dangerous account group, certain accounts in that dangerous account group may be accounts that have been stolen and are not fraudulent accounts. In order to distinguish which account in the dangerous account group is more fraudulent in a better manner, the present embodiment further identifies a dangerous user identity in the connected component and ultimately determines that an account associated with the dangerous user identity to be a dangerous account on the basis of the first embodiment. FIG. 5 is a flowchart illustrating a method of identifying a website user in accordance with another embodiment of the present disclosure. The method includes the following blocks:

Block 501 obtains accounts and user identities from a database.

Block 502 builds a connected graph by taking the accounts and the user identities as nodes and connecting account nodes and user identity nodes having association relationship therebetween.

Block 503 finds a connected component from the connected graph, accounts corresponding to all account nodes in the connected component forming an account group that is bound to a same website user.

Block 504 computes an account density and a fraud account closing rate of the account group.

Block 505 determines whether the account density and the fraud account closing rate are within a predetermined normal value range, and goes to block 506 if affirmative or goes to block 507 otherwise.

Block 506 determines that the account group is a dangerous account group and the website user bound to the account group is a dangerous website user, and block 508 is executed.

Block 507 determines that the account group is a normal account group and the website user bound to the account group is a normal website user. The process is ended.

Processes of executing blocks 501-507 can be referenced to blocks 101-107 of the first embodiment. These processes have been described in detail in the first embodiment and will not be redundantly described herein.

Block 508 computes an identity fraud closing rate of a user identity that corresponds to a user identity node in the connected component.

For example, in the connected component as shown in FIG. 4, when an account group formed by accounts that correspond to all account nodes is determined to be a dangerous account group, an identity fraud closing rate of a user identity corresponding to a user identity node in the connected component as shown in FIG. 4 is calculated.

An identity fraud closing rate of a user identity corresponding to a user identity node in the connected component is calculated using the following approach:

counting a total number of accounts in the account group that are associated with the user identity, and counting a number of accounts that are closed due to fraud and/or suspected fraud from among the total number of accounts associated with the user identity; and calculating a ratio between the number of accounts that are closed due to fraud and/or suspected fraud from among the total number of accounts associated with the user identity and the total number of accounts in the account group that are associated with the user identity, wherein the ratio is the identity fraud closing rate of the user identity.

Block 509 determines whether the identity fraud closing rate is within a predetermined normal data range, and goes to block 510 if affirmative, or goes to block 511 otherwise.

Block 510 determines that the user identity is a dangerous user identity and an account associated with the user identity is a dangerous account. The process is ended.

Block 511 determines that the user identity is a normal user identity and an account associated with the user identity is a normal account. The process is ended.

In this block, among accounts bound to a known dangerous website user, an identity fraud closing rate of a user identity associated with these accounts may be calculated empirically in advance. An average value may be determined using sample statistics, and the average value can be used as a normal value range for the identity fraud closing rate.

In a practical implementation, different normal value ranges may be configured based on a fraud account closing rate of an account group and a total number of accounts associated with a user identity in the account group. For example, if a fraud account closing rate of an account group is greater than 0.2 and a total number of account associated with a user identity in the account group is greater than one hundred, a normal value range for an identity fraud closing rate can be set as any value greater than 0.2. If the total number of account associated with the user identity in the account group is within a closed interval of [5, 100], and a normal value range for an identity fraud closing rate can be set as any value greater than 0.5. The normal value range of the identity fraud closing rate can be set to other values if the fraud account closing rate of the account group and the total number of accounts associated with the user identity in the account group fall in other ranges. The present disclosure has no limitation on specific values for a normal value range of an identity fraud closing rate.

As can be seen from the above, the example embodiments find directly and indirectly associated accounts from the massive volume of accounts and user identities in a database using graph theory. A website user can be comprehensively and accurately identified from an account group constructed from the accounts and the user identities associated with these accounts that belongs to a same website user. In addition, when finding the account group using the graph theory, a server does not need to perform searches in all accounts and user identities, thus reducing the workload of the server and improving the processing speed of the server. With regard to a website user who owns an account group, identification can be made in advance as to whether the website user is a dangerous website user based on computing an account density and a fraud account closing rate of the account group, thus achieving the goal of preventing a fraudulent event in advance.

Furthermore, which accounts in the account group are more fraudulent can be identified in a better manner.

Third Embodiment

Figure 6:
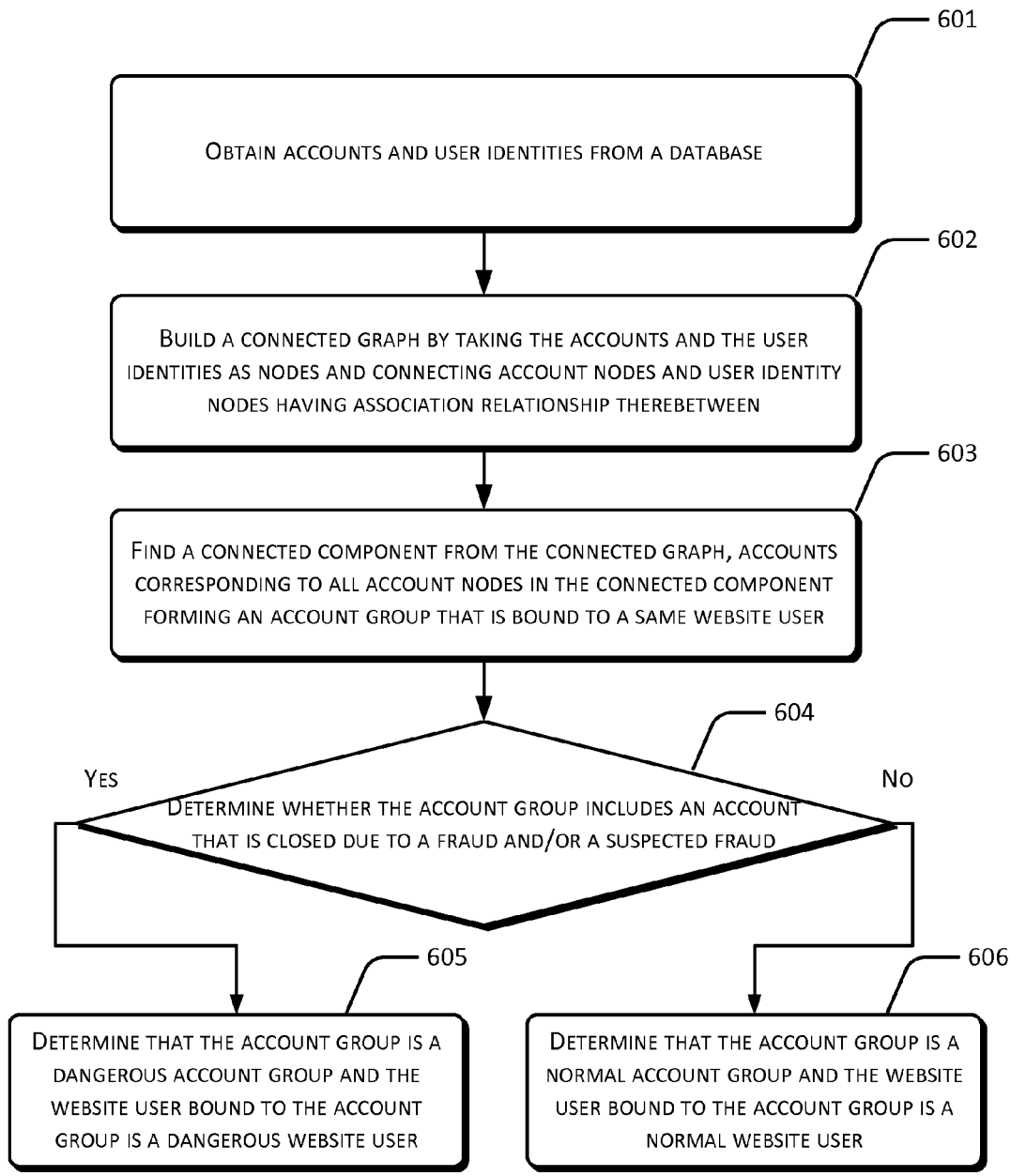
FIG. 6 is a flowchart of another method of identifying a website user in accordance with the present disclosure.

In addition to determining whether an account group is a dangerous account group using an account density and a fraud account closing rate in the first embodiment, whether an account group is a dangerous account group can be determined based on whether the account group includes an account that has been closed due to fraud and/or suspected fraud. FIG. 6 shows a flowchart illustrating a method of identifying a website user in accordance with another embodiment of the present disclosure, and includes the following blocks:

Block 601 obtains accounts and user identities from a database.

Block 602 builds a connected graph by taking the accounts and the user identities as nodes and connecting account nodes and user identity nodes having association relationship therebetween.

Block 603 finds a connected component from the connected graph, accounts corresponding to all account nodes in the connected component forming an account group that is bound to a same website user.

Processes of executing blocks 601-603 can be referenced to blocks 101-103 of the first embodiment. These processes have been described in details in the first embodiments and will not be redundantly described herein.

Block 604 determines whether the account group includes an account that has been closed due to fraud and/or suspected fraud, and goes to block 605 if affirmative, or goes to block 606 otherwise.

A monitoring system of a website monitors activities associated with all accounts. If a fraudulent activity performed by a certain account is found, that account will be closed as a fraud account. If an abnormal activity associated with a certain account is discovered upon analysis, the account will be closed as a suspected fraud account. The system further performs labeling of these accounts that are closed due to a fraud or a suspected fraud. In the present disclosure, which accounts in the account group that have been closed due to fraud or suspected fraud can be directly identified through the labeling.

Block 605 determines that the account group is a dangerous account group and the website user bound to the account group is a dangerous website user. The process is ended.

Block 606 determines that the account group is a normal account group and the website user bound to the account group is a normal website user. The process is ended.

As can be seen from above, the example embodiments find directly and indirectly associated accounts from the massive volume of accounts and user identities in a database using graph theory. A website user can be comprehensively and accurately identified from an account group constructed from the accounts and the user identities associated with these accounts that belongs to a same website user. In addition, when finding the account group using the graph theory, a server does not need to perform searches in all accounts and user identities, thus reducing the workload of the server and improving the processing speed of the server. With regard to a website user who owns an account group, identification can be made in advance as to whether the website user is a dangerous website user based on whether the account group includes an account that is closed due to a fraud and/or a suspected fraud.

Fourth Embodiment

Figure 7:
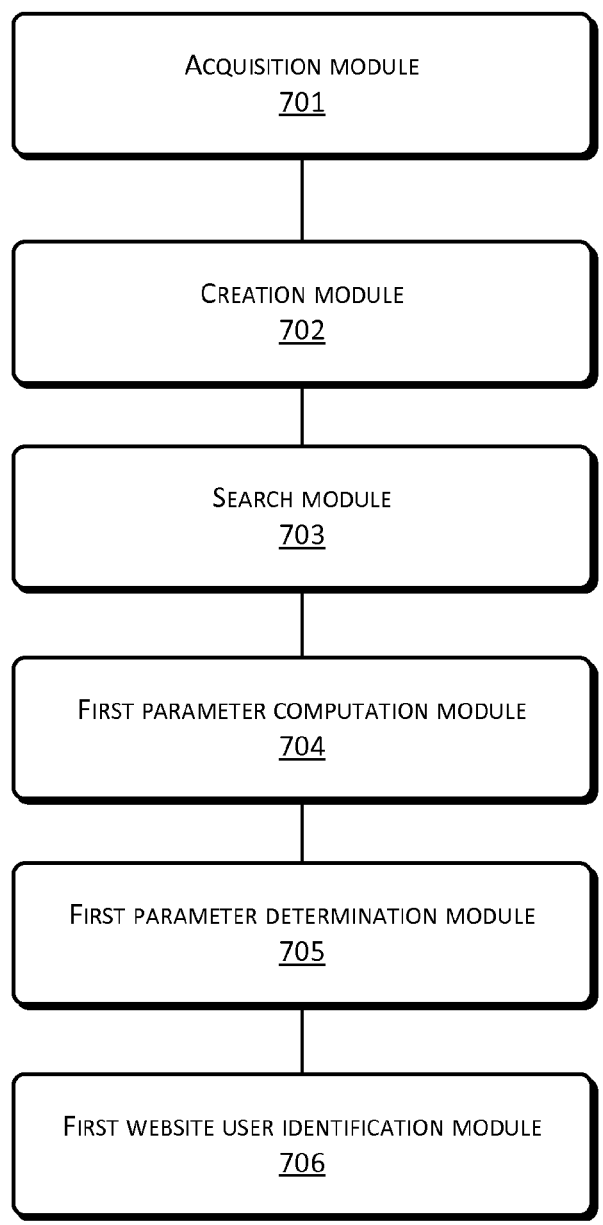
FIG. 7 is a structural diagram illustrating an example apparatus of identifying a website user in accordance with the present disclosure.

In correspondence with the method of identifying a website user in the first embodiment, the present disclosure further provides an example apparatus of identifying a website user. FIG. 7 is a structural diagram illustrating an example apparatus of identifying a website user. The apparatus includes an acquisition module 701, a creation module 702, a search module 703, a first parameter computation module 704, a first parameter determination module 705, and a first website user identification module 706. Internal structures and connecting relationships of the apparatus will be described in further detail in conjunction with its operating principles.

The acquisition module 701 is used for obtaining accounts and user identities from a database.

The creation module 702 is used for building a connected graph by taking the accounts and the user identities as nodes and connecting account nodes and user identity nodes having association relationship therewith.

The search module 703 is used for finding a connected component from the connected graph, accounts corresponding to all account nodes in the connected component forming an account group that is bound to a same website user.

The first parameter computation module 704 is used for computing an account density and a fraud account closing rate of the account group.

The first parameter determination module 705 is used for determining whether the account density and the fraud account closing rate are within respective predetermined normal value ranges.

The first website user identification module 706 is used for determining that the account group is a dangerous account group and a website user bound to the dangerous account group is a dangerous website user if a determination result of the first parameter determination module is affirmative, and determining that the account group is a normal account group and a website user bound to the normal account group is a normal website user otherwise.

Figure 8:
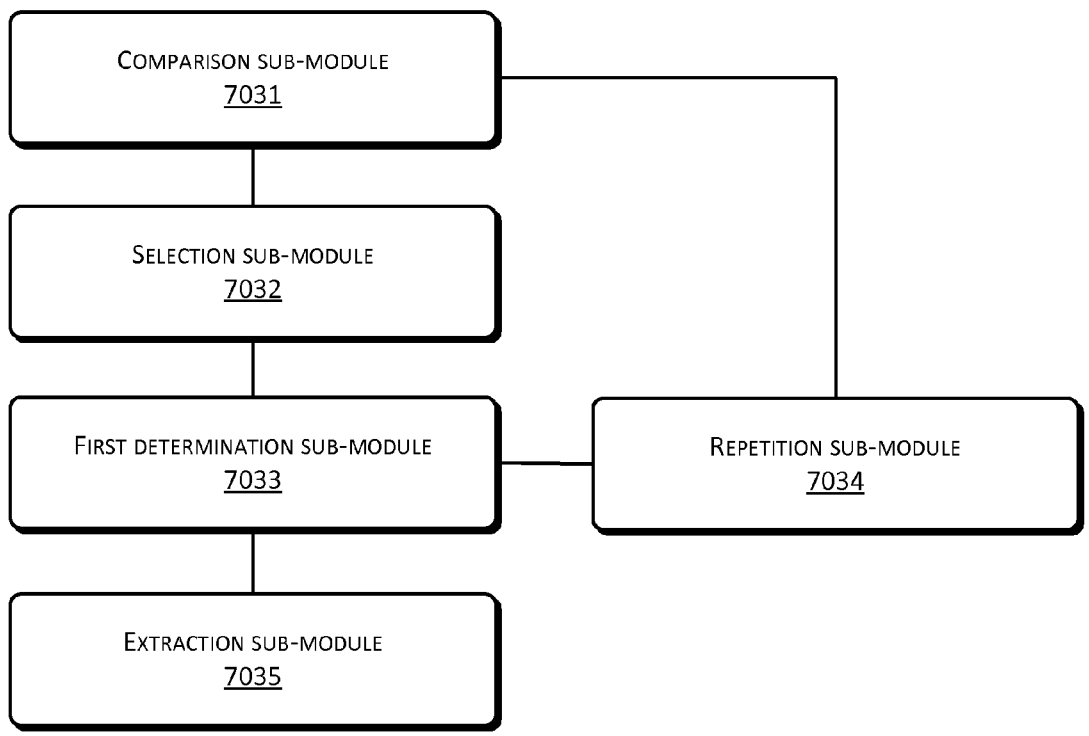
FIG. 8 is a structural diagram illustrating a search module in accordance with the present disclosure.

As shown in FIG. 8, the search module 703 includes:

a comparison sub-module 7031 used for comparing a current label value of each node with a current label value of other nodes having a connection relationship with the respective node in the connected graph;

a selection sub-module used 7032 for selecting a minimum label value as the current label value of each node;

a first determination sub-module 7033 used for determining whether a current label value of at least one node is changed;

a repetition sub-module 7034 used for triggering the comparison sub-module to continue comparing the current label value of each node with the current label value of the other nodes having the connection relationship with the respective node in the connected graph when a determination result of the first determination module is affirmative; and an extraction sub-module 7035 used for extracting nodes having a same label value from the connected graph as the connected component when the determination result of the first determination module is negative.

In one embodiment, the first parameter computation module 704 includes:

a first counting sub-module used for counting a total number of all accounts and a sum of node degrees of account nodes corresponding to all the accounts in the account group; and a density computation sub-module used for calculating the account density according to a formula:

$$\frac{\text{the sum of the node degrees of the account nodes}}{\text{corresponding to all the accounts in the account group}}\,,$$
$$n \times (n-1)$$

wherein n is the total number of all accounts in the account group.

Additionally or alternatively, the first parameter computation module 704 includes:

a second counting sub-module used for counting a total number of all accounts and a number of accounts that have been closed due to a fraud and/or a suspected fraud in the account group; and a fraud account closing rate computation sub-module used for calculating a ratio between the number of accounts that have been closed due to a fraud and/or a suspected fraud and the total number of all the accounts in the account group, wherein the ratio corresponds to the fraud account closing rate of the account group.

Figure 9:
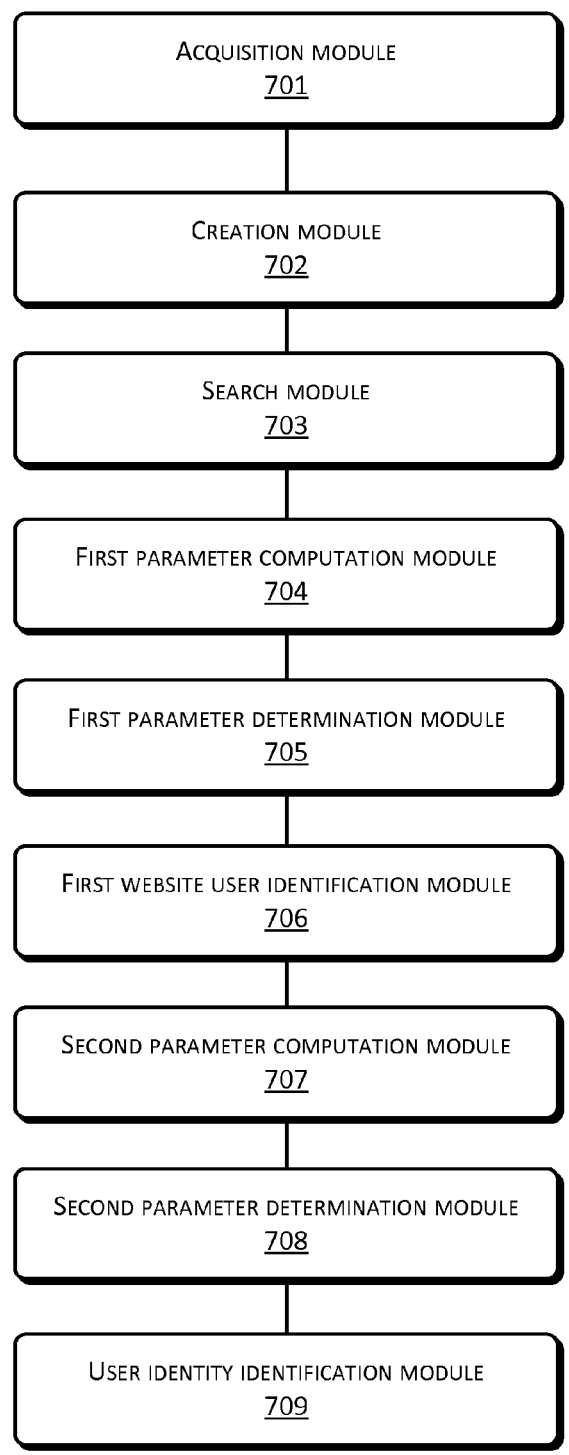
FIG. 9 is a structural diagram illustrating another example apparatus of identifying a website user in accordance with the present disclosure.

Based on the structure shown in FIG. 8, the apparatus, as shown in FIG. 9, may further include:

a second parameter computation module 707 used for calculating an identity fraud closing rate of a user identity corresponding to a user identity node in the connected component;

a second parameter determination module 708 used for determining whether the identity fraud closing rate is within a predetermined normal data range; and a user identity identification module 709 used for determining that the user identity is a dangerous user identity and an account associated with the user identity is a dangerous account when a determination result of the second parameter determination module is positive, or determining that the user identity is a normal user identity and an account associated with the user identity is a normal account otherwise.

In one embodiment, the second parameter computation module 707 includes:

a third counting sub-module used for counting a total number of accounts in the account group that are associated with the user identity, and counting a number of accounts that are closed due to a fraud and/or a suspected fraud from among the total number of accounts associated with the user identity; and an identity fraud closing rate computation sub-module used for calculating a ratio between the number of accounts that are closed due to a fraud and/or a suspected fraud from among the total number of accounts associated with the user identity and the total number of accounts in the account group that are associated with the user identity, wherein the ratio is the identity fraud closing rate of the user identity.

As can be seen from above, the example embodiments find directly and indirectly associated accounts from the massive volume of accounts and user identities in a database using graph theory. A website user can be comprehensively and accurately identified from an account group constructed from the accounts and the user identities associated with these accounts that belongs to a same website user. In addition, when finding the account group using the graph theory, a server does not need to perform searches in all accounts and user identities, thus reducing the workload of the server and improving the processing speed of the server. With regard to a website user who owns an account group, identification can be made in advance as to whether the website user is a dangerous website user based on computing an account density and a fraud account closing rate of the account group, thus achieving the goal of preventing a fraud event in advance.

Furthermore, which accounts in the account group are more fraudulent can be identifies in a better manner.

Fifth Embodiment

Figure 10:
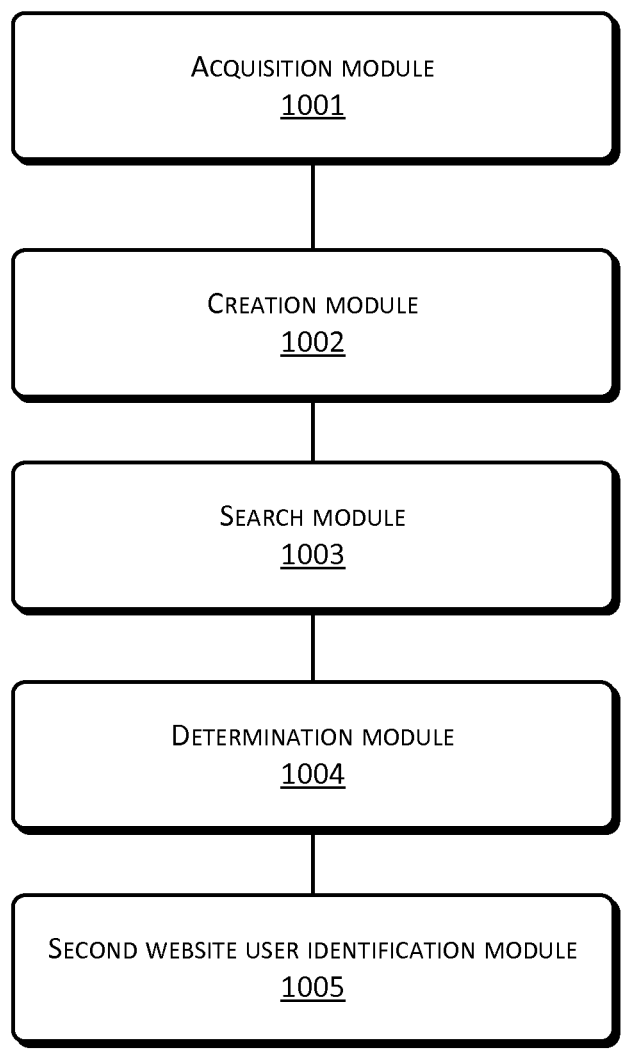
FIG. 10 is a structural diagram illustrating another example apparatus of identifying a website user in accordance with the present disclosure.

In correspondence with the method of identifying a website user in the third embodiment, the present disclosure further provides an example apparatus of identifying a website user. FIG. 10 is a structural diagram illustrating an example apparatus of identifying a website user. The apparatus includes an acquisition module 1001, a creation module 1002, a search module 1003, a determination module 1004, and a second website user identification module 1005.

Internal structures and connecting relationships of the apparatus will be described in further detail in conjunction with its operating principles.

The acquisition module 1001 is used for obtaining accounts and user identities from a database.

The creation module 1002 is used for building a connected graph by taking the accounts and the user identities as nodes and connecting account nodes and user identity nodes having association relationship therewith.

The search module 1003 is used for finding a connected component from the connected graph, accounts corresponding to all account nodes in the connected component forming an account group that is bound to a same website user.

The determination module 1004 is used for determining whether an account that has been closed due to a fraud and/or a suspected fraud exists in the account group.

The second website user identification module 1005 is used for determining that the account group is a dangerous account group and a website user bound to the dangerous account group is a dangerous website user if a determination result of the determination module is affirmative, and determining that the account group is a normal account group and a website user bound to the normal account group is a normal website user otherwise.

In one embodiment, the search module 1003 includes:

a comparison sub-module used for comparing a current label value of each node with a current label value of other nodes having a connection relationship with the respective node in the connected graph;

a selection sub-module used for selecting a minimum label value as the current label value of each node;

a first determination sub-module used for determining whether a current label value of at least one node is changed;

a repetition sub-module used for triggering the comparison sub-module to continue comparing the current label value of each node with the current label value of the other nodes having the connection relationship with the respective node in the connected graph when a determination result of the first determination module is affirmative; and an extraction sub-module used for extracting nodes having a same label value from the connected graph as the connected component when the determination result of the first determination module is negative.

Based on the structure in FIG. 10, the apparatus may further include:

a second parameter computation module used for calculating an identity fraud closing rate of a user identity corresponding to a user identity node in the connected component;

a second parameter determination module used for determining whether the identity fraud closing rate is within a predetermined normal data range; and a user identity identification module used for determining that the user identity is a dangerous user identity and an account associated with the user identity is a dangerous account when a determination result of the second parameter determination module is positive, or determining that the user identity is a normal user identity and an account associated with the user identity is a normal account otherwise.

In one embodiment, the second parameter computation module includes:

a third counting sub-module used for counting a total number of accounts in the account group that are associated with the user identity, and counting a number of accounts that are closed due to a fraud and/or a suspected fraud from among the total number of accounts associated with the user identity; and an identity fraud closing rate computation sub-module used for calculating a ratio between the number of accounts that are closed due to a fraud and/or a suspected fraud from among the total number of accounts associated with the user identity and the total number of accounts in the account group that are associated with the user identity, wherein the ratio is the identity fraud closing rate of the user identity.

As can be seen from above, the example embodiments find directly and indirectly associated accounts from the massive volume of accounts and user identities in a database using graph theory. A website user can be comprehensively and accurately identified from an account group constructed from the accounts and the user identities associated with these accounts that belongs to a same website user. In addition, when finding the account group using the graph theory, a server does not need to perform searches in all accounts and user identities, thus reducing the workload of the server and improving the processing speed of the server. With regard to a website user who owns an account group, identification can be made in advance as to whether the website user is a dangerous website user based on whether the account group includes an account that is closed due to a fraud and/or a suspected fraud.

It should be noted that one of ordinary skill in the art can understand that all or parts of the example methods can be implemented through a computer program that instructs a related hardware. The program can be stored in computer readable storage media. During execution, the program may include processes of the methods in the foregoing embodiments. The storage media may include a magnetic disk, an optical disk, a ROM (read-only memory), or a RAM (random access memory), etc.

Figure 11:
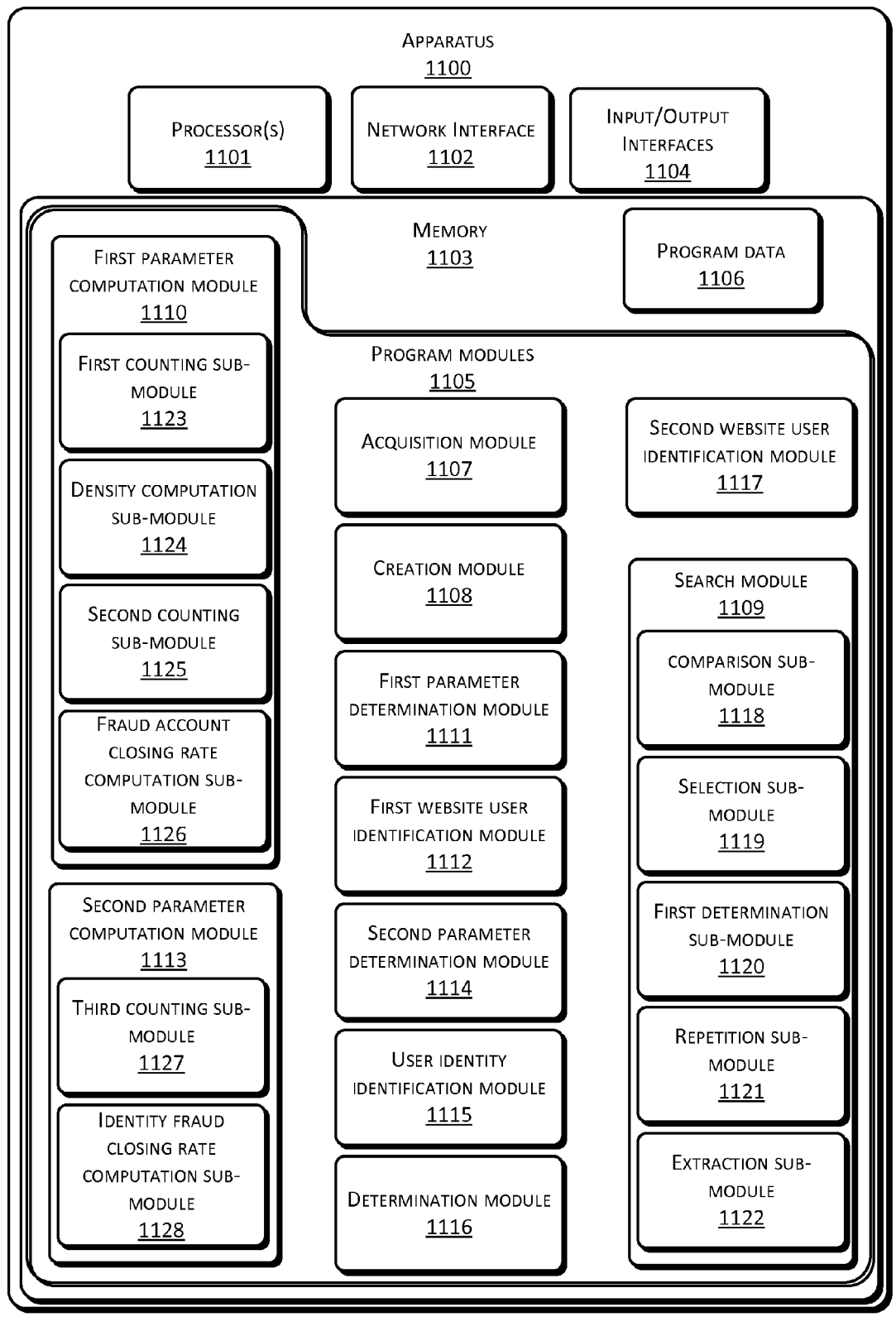
FIG. 11 is a structural diagram illustrating an example apparatus in accordance with the embodiments of the present disclosure.

FIG. 11 illustrates an example apparatus 1100, such as the apparatus as described above, in more detail. In one embodiment, the apparatus 1100 can include, but is not limited to, one or more processors 1101, a network interface 1102, memory 1103, and an input/output interface 1104.

The memory 1103 may include computer-readable media in the form of volatile memory, such as random-access memory (RAM) and/or non-volatile memory, such as read only memory (ROM) or flash RAM. The memory 1103 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 1103 may include program modules 1105 and program data 1106. In one embodiment, the program modules 1105 may include an acquisition module 1107, a creation module 1108, a search module 1109, a first parameter computation module 1110, a first parameter determination module 1111, a first website user identification module 1112, a second parameter computation module 1113, a second parameter determination module 1114, a user identity identification module 1115, a determination module 1116, and a second website user identification module 1117. Furthermore, the search module 1109 may include a comparison sub-module 1118, a selection sub-module 1119, a first determination sub-module 1120, a repetition sub-module 1121 and an extraction sub-module 1122. The first parameter computation module 1110 may include a first counting sub-module 1123, a density computation sub-module 1124, a second counting sub-module 1125 and a fraud account closing rate computation sub-module 1126. In one embodiment, the second parameter computation module 1113 may include a third counting sub-module 1127 and an identity fraud closing rate computation sub-module 1128. Details about these program modules and sub-modules may be found in the foregoing embodiments described above.

Methods and apparatuses of identifying a website user have been described in the present disclosure in detail above. Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skill in the art may modify the exemplary embodiments and application fields. All in all, contents in the present disclosure should not be construed as limitations to the present disclosure.

What is claimed is:

1. A method comprising:

storing, by an apparatus, in a database, an account and a corresponding user identity for each website user logging into a website;

obtaining, by the apparatus, from the database, a list of accounts of the website, each account being associated with a user identity, and a list of user identities associated with the accounts of the website;

building, by the apparatus, a connected graph by taking the accounts and the user identities as nodes and connecting account nodes and user identity nodes having association relationship therewith;

finding, by the apparatus, a connected component from the connected graph, accounts corresponding to all account nodes in the connected component forming an account group that is bound to a same website user;

computing, by a processor of the apparatus, an account density and a fraud account closing rate of the account group;

determining, by the apparatus, whether the account density and the fraud account closing rate are within respective predetermined normal value ranges;

based at least in part on the determined account density and fraud account closing rate, the apparatus determining that the account group is a dangerous account group, and determining a website user bound to the dangerous account group is a dangerous website user if the account group is the dangerous account group, or determining that the account group is a normal account group, and determining a website user bound to the normal account group is a normal website user if the account group is the normal account group; and closing, caused by the apparatus, the accounts in the dangerous account group based on determining that the account group is a dangerous account group.

2. The method as recited in claim 1, wherein finding the connected component in the connected graph comprises:

comparing, by the apparatus, a current label value of each node with a current label value of other nodes having a connection relationship with the respective node in the connected graph;

selecting, by the apparatus, a minimum label value as the current label value of each node;

determining, by the apparatus, whether a current label value of at least one node is changed, and continuing to compare, by the apparatus, the current label value of each node with the current label value of the other nodes having the connection relationship with the respective node in the connected graph if the current label value of the at least one node is determined to be changed, and extracting, by the apparatus, nodes having a same label value from the connected graph as the connected component if the current label value of the at least one node is determined not to be changed.

3. The method as recited in claim 1, wherein computing the account density of the account group comprises:

counting, by the apparatus, a total number of all accounts and a sum of node degrees of account nodes corresponding to all the accounts in the account group; and calculating, by the apparatus, the account density according to a formula:

$$\frac{\text{the sum of the node degrees of the account nodes corresponding to all the accounts in the account group}}{n \times (n-1)}$$

wherein n is the total number of all accounts in the account group.

4. The method as recited in claim 1, wherein computing the fraud account closing rate of the account group comprises:

counting, by the apparatus, a total number of all accounts and a number of accounts that have been closed due to a fraud and/or a suspected fraud in the account group; and calculating, by the processor of the apparatus, a ratio between the number of accounts that have been closed due to a fraud and/or a suspected fraud and the total number of all the accounts in the account group, wherein the ratio corresponds to the fraud account closing rate of the account group.

5. The method as recited in claim 1, wherein after determining that the account group is a dangerous account group and the website user bound to the dangerous account group is a dangerous website user, the method further comprises:

calculating, by the processor of the apparatus, an identity fraud closing rate of a user identity corresponding to a user identity node in the connected component;

determining, by the apparatus, whether the identity fraud closing rate is within a predetermined normal data range; and determining, by the apparatus, that the user identity is a dangerous user identity, and determining an account associated with the user identity is a dangerous account if the account group is the dangerous account group, or determining that the user identity is a normal user identity, and determining the account associated with the user identity is a normal account if the account group is the normal account group.

6. The method as recited in claim 5, wherein calculating the identity fraud closing rate of the user identity corresponding to the user identity node in the connected component comprises:

counting, by the apparatus, a total number of accounts in the account group that are associated with the user identity, and counting a number of accounts that are closed due to a fraud and/or a suspected fraud from among the total number of accounts associated with the user identity; and calculating, by the processor of the apparatus, a ratio between the number of accounts that are closed due to a fraud and/or a suspected fraud from among the total number of accounts associated with the user identity and the total number of accounts in the account group that are associated with the user identity, wherein the ratio is the identity fraud closing rate of the user identity.

7. A method comprising:

storing, by an apparatus, in a database, an account and a corresponding user identity for each website user logging into a website;

obtaining, by the apparatus, from the database, a list of accounts of the website, each account being associated with a user identity, and a list of user identities associated with the accounts of the website;

building, by the apparatus, a connected graph by taking the accounts and the user identities as nodes and connecting account nodes and user identity nodes having association relationship therewith;

finding, by the apparatus, a connected component from the connected graph, accounts corresponding to all account nodes in the connected component forming an account group that is bound to a same website user;

determining, by the apparatus, whether an account that has been closed due to one of a fraud or a suspected fraud exists in the account group, and if the account is determined to be closed due to one of a fraud or a suspected fraud, the apparatus determining that the account group is a dangerous account group and a website user bound to the dangerous account group is a dangerous website user;

if the account is determined not to be closed due to one of a fraud or a suspected fraud, the apparatus determining that the account group is a normal account group and a website user bound to the normal account group is a normal website user; and wherein the apparatus is configured to close the accounts in the dangerous account group based on the apparatus determining that the account group is a dangerous account group.

8. The method as recited in claim 7, wherein finding the connected component in the connected graph comprises:

comparing, by the apparatus, a current label value of each node with a current label value of other nodes having a connection relationship with the respective node in the connected graph;

selecting, by the apparatus, a minimum label value as the current label value of each node;

determining, by the apparatus, whether a current label value of at least one node is changed, and continuing to compare, by the apparatus, the current label value of each node with the current label value of the other nodes having the connection relationship with the respective node in the connected graph if the current label value of at least one node is determined to be changed; and extracting, by the apparatus, nodes having a same label value from the connected graph as the connected component if the current label value of at least one node is determined not to be changed.

9. The method as recited in claim 7, wherein after determining that the account group is a dangerous account group and the website user bound to the dangerous account group is a dangerous website user, the method further comprises:

calculating, by a processor of the apparatus, an identity fraud closing rate of a user identity corresponding to a user identity node in the connected component;

determining, by the apparatus, whether the identity fraud closing rate is within a predetermined normal data range; and determining, by the apparatus, that the user identity is a dangerous user identity, and an account associated with the user identity is a dangerous account if the determined identity fraud closing rate is not within a predetermined normal data range, or determining that the user identity is a normal user identity and the account associated with the user identity is a normal account if the determined identity fraud closing rate is not within a predetermined normal data range.

10. The method as recited in claim 9, wherein calculating the identity fraud closing rate of the user identity corresponding to the user identity node in the connected component comprises:

counting, by the apparatus, a total number of accounts in the account group that are associated with the user identity, and counting a number of accounts that are closed due to a fraud and/or a suspected fraud from among the total number of accounts associated with the user identity; and calculating, by the processor of the apparatus, a ratio between the number of accounts that are closed due to a fraud and/or a suspected fraud from among the total number of accounts associated with the user identity and the total number of accounts in the account group that are associated with the user identity, wherein the ratio is the identity fraud closing rate of the user identity.

11. A system comprising:
an apparatus comprising:
at least one processor configured to execute computer-readable instructions;
a memory coupled to the at least one processor, the memory storing the computer-readable instructions in a plurality of modules including:
an acquisition module used for obtaining a list of accounts of a website, each account being associated with a user identity, and a list of user identities associated with the accounts of the website, the acquisition module obtaining the list of accounts and user identities from a database storing an account and a corresponding user identity for each website user logging into the website;
a creation module used for building a connected graph by taking the accounts and the user identities as nodes and connecting account nodes and user identity nodes having association relationship therewith;

a search module used for finding a connected component from the connected graph, the accounts corresponding to all account nodes in the connected component forming an account group that is bound to a same website user;

a first parameter computation module used for computing an account density and a fraud account closing rate of the account group;

a first parameter determination module used for determining whether the account density and the fraud account closing rate are within respective predetermined normal value ranges; and a first website user identification module used for determining, based on the determined account density and fraud account closing rate, that the account group is a dangerous account group, and determining a website user bound to the dangerous account group is a dangerous website user if a result of the first parameter determination module determines the account density and the fraud account closing rate are not within the respective predetermined normal value ranges, and determining that the account group is a normal account group, and determining a website user bound to the normal account group is a normal website user if a result of the first parameter determination module determines the account density and the fraud account closing rate are within the respective predetermined normal value ranges; and wherein the system is configured to close the accounts in the dangerous account group based on the determining that the account group is a dangerous account group.

12. The system as recited in claim 11, wherein the search module comprises:

a comparison sub-module used for comparing a current label value of each node with a current label value of other nodes having a connection relationship with the respective node in the connected graph;

a selection sub-module used for selecting a minimum label value as the current label value of each node;

a first determination sub-module used for determining whether a current label value of at least one node is changed;

a repetition sub-module used for triggering the comparison sub-module to continue comparing the current label value of each node with the current label value of the other nodes having the connection relationship with the respective node in the connected graph when a determination result of the first determination module determines the current label value of at the least one node is changed; and an extraction sub-module used for extracting nodes having a same label value from the connected graph as the connected component when the determination result of the first determination module determines the current label value of at the least one node is not changed.

13. The system as recited in claim 11, wherein the first parameter computation module comprises:

a first counting sub-module used for counting a total number of all accounts and a sum of node degrees of account nodes corresponding to all the accounts in the account group; and a density computation sub-module used for calculating the account density according to a formula:

$$\frac{\text{the sum of the node degrees of the account nodes corresponding to all the accounts in the account group}}{n \times (n-1)},$$

wherein n is the total number of all accounts in the account group.

14. The system as recited in claim 11, wherein the first parameter computation module comprises:
   a second counting sub-module used for counting a total number of all accounts and a number of accounts that have been closed due to a fraud and/or a suspected fraud in the account group; and
   a fraud account closing rate computation sub-module used for calculating a ratio between the number of accounts that have been closed due to a fraud and/or a suspected fraud and the total number of all the accounts in the account group, wherein the ratio corresponds to the fraud account closing rate of the account group.

15. The system as recited in claim 11, wherein after determining that the account group is a dangerous account group and the website user bound to the dangerous account group is a dangerous website user, the apparatus further comprises:
   a second parameter computation module used for calculating an identity fraud closing rate of a user identity corresponding to a user identity node in the connected component;
   a second parameter determination module used for determining whether the identity fraud closing rate is within a predetermined normal data range; and
   a user identity identification module used for determining that the user identity is a dangerous user identity and an account associated with the user identity is a dangerous account when a determination result of the second parameter determination module is positive, or determining that the user identity is a normal user identity and an account associated with the user identity is a normal account otherwise.

16. The system as recited in claim 15, wherein the second parameter computation module comprises:
   a third counting sub-module used for counting a total number of accounts in the account group that are associated with the user identity, and counting a number of accounts that are closed due to a fraud and/or a suspected fraud from among the total number of accounts associated with the user identity; and
   an identity fraud closing rate computation sub-module used for calculating a ratio between the number of accounts that are closed due to a fraud and/or a suspected fraud from among the total number of accounts associated with the user identity and the total number of accounts in the account group that are associated with the user identity, where the ratio is the identity fraud closing rate of the user identity.

17. A system comprising:
   an apparatus comprising:
      at least one processor configured to execute computer-readable instructions;
      a memory coupled to the at least one processor, the memory storing the computer-readable instructions in a plurality of modules including:
         an acquisition module used for obtaining a list of accounts of a website, each account being associated with a user identity, and a list of user identities associated with the accounts of the website, the acquisition module obtaining the list of account and user identities from a database storing an account and a corresponding user identity for each website user logging into the website;
         a creation module used for building a connected graph by taking the accounts and the user identities as nodes and connecting account nodes and user identity nodes having association relationship therewith;
         a search module used for finding a connected component from the connected graph, accounts corresponding to all account nodes in the connected component forming an account group that is bound to a same website user;
         a determination module used for determining whether an account that has been closed due to one of a fraud or a suspected fraud exists in the account group; and
         a second website user identification module used for determining, based on the determined account closure due to fraud or suspected fraud, that the account group is a dangerous account group, and determining a website user bound to the dangerous account group is a dangerous website user if a determination result of the determination module determines the account that has been closed due to one of a fraud or a suspected fraud exists in the account group, and determining that the account group is a normal account group, and determining a website user bound to the normal account group is a normal website user if a determination result of the determination module determines the account that has not been closed due to one of a fraud or a suspected fraud exists in the account group; and
      wherein the system is configured to close the accounts in the dangerous account group based on the determining that the account group is a dangerous account group.

18. The system as recited in claim 17, wherein the search module comprises:
   a comparison sub-module used for comparing a current label value of each node with a current label value of other nodes having a connection relationship with the respective node in the connected graph;
   a selection sub-module used for selecting a minimum label value as the current label value of each node;
   a first determination sub-module used for determining whether a current label value of at least one node is changed;
   a repetition sub-module used for triggering the comparison sub-module to continue comparing the current label value of each node with the current label value of the other nodes having the connection relationship with the respective node in the connected graph when a determination result of the first determination module determines the current label value of the at least one node is changed; and
   an extraction sub-module used for extracting nodes having a same label value from the connected graph as the connected component when the determination result of the first determination module determines the current label value of the at least one node is not changed.

19. The system as recited in claim 17, wherein after determining that the account group is a dangerous account group and the website user bound to the dangerous account group is a dangerous website user, the apparatus further comprises:

a second parameter computation module used for calculating an identity fraud closing rate of a user identity corresponding to a user identity node in the connected component;

a second parameter determination module used for determining whether the identity fraud closing rate is within a predetermined normal data range; and a user identity identification module used for determining that the user identity is a dangerous user identity and an account associated with the user identity is a dangerous account when a determination result of the second parameter determination module is positive, or determining that the user identity is a normal user identity and an account associated with the user identity is a normal account otherwise.

20. The system as recited in claim 19, wherein the second parameter computation module comprises:

a third counting sub-module used for counting a total number of accounts in the account group that are associated with the user identity, and counting a number of accounts that are closed due to a fraud and/or a suspected fraud from among the total number of accounts associated with the user identity; and an identity fraud closing rate computation sub-module used for calculating a ratio between the number of accounts that are closed due to a fraud and/or a suspected fraud from among the total number of accounts associated with the user identity and the total number of accounts in the account group that are associated with the user identity, where the ratio is the identity fraud closing rate of the user identity.

\* \* \* \* \*